Figure 1:
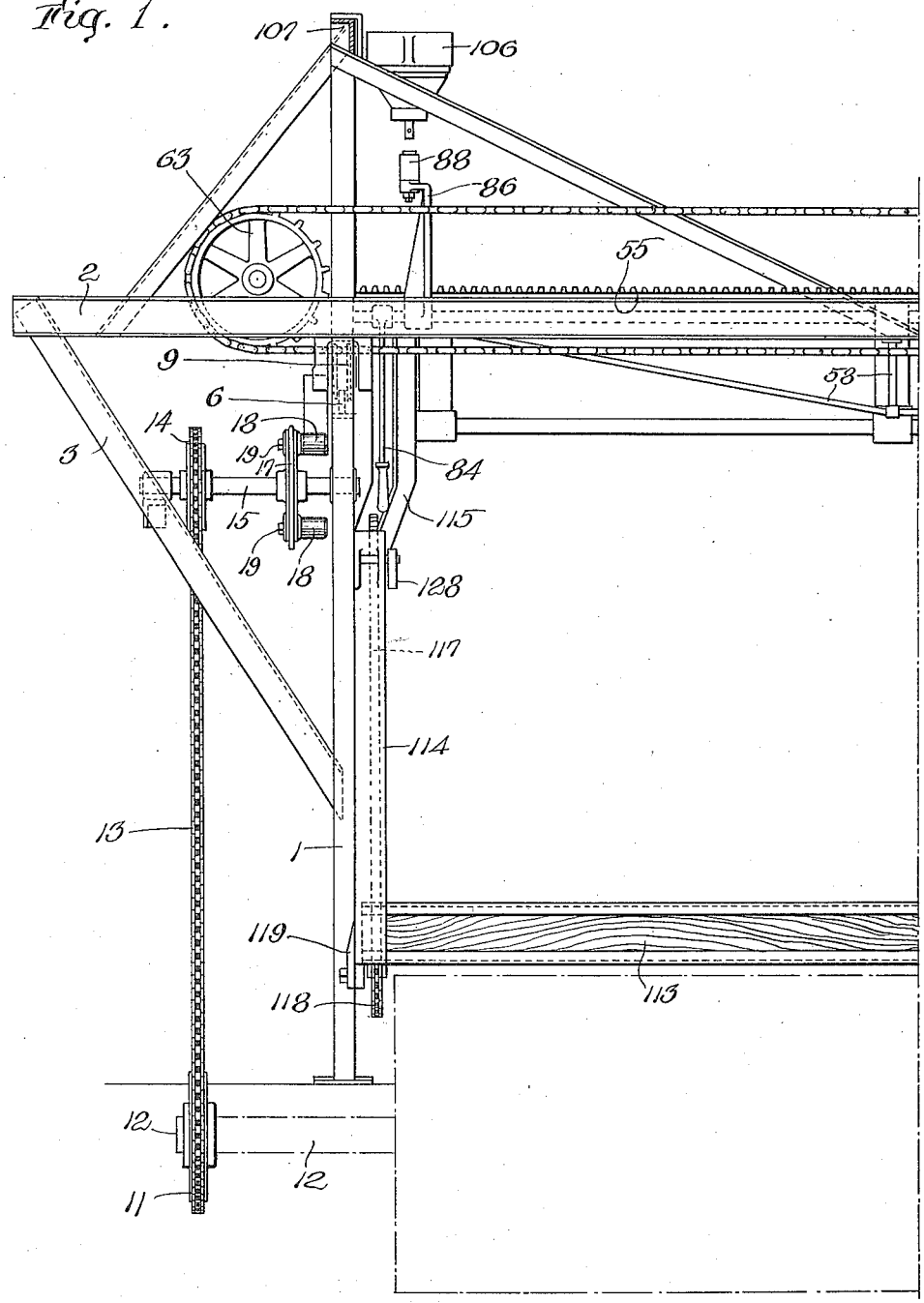

R. C. PENFIELD.
BRICK SANDING MACHINE.
APPLICATION FILED JUNE 8, 1911.

1,161,516.

Patented Nov. 23, 1915.
6 SHEETS—SHEET 6.

Witnesses:
C. L. Rogers
W. P. McCrate

Inventor:
Raymond C. Penfield,
by Geo. H. Maxwell,
Attorney

UNITED STATES PATENT OFFICE.

RAYMOND C. PENFIELD, OF NEW YORK, N. Y.

BRICK-SANDING MACHINE.

1,161,516.

Specification of Letters Patent.

Patented Nov. 23, 1915.

Application filed June 8, 1911. Serial No. 632,056.

*To all whom it may concern:*

Be it known that I, RAYMOND C. PENFIELD, citizen of the United States, and resident of New York city, in the county and State of New York, have invented an Improvement in Brick-Sanding Machines, of which the following description, in connection with the accompanying drawings, is a specification, like letters on the drawings representing like parts.

In carrying out certain processes for the manufacture of brick, particularly paving brick, where the heat of burning is sufficient to bring the brick to a point of vitrification, it is essential that a layer of sand be spread over the top of each layer of brick as the brick are stacked, before the next layer is deposited thereon in order to prevent the bricks from welding or melting together in the kiln. The usual manner of spreading the sand on the brick layers, after they are repressed and preliminary to the burning, is to sprinkle the sand on each layer by hand, this work being done in the old methods of hand setting either by the setter or by a sand boy employed for this work, the operative removing the sand from a bucket or box and throwing it over the layer. By this method the spreading of the sand is more or less uneven, and like all hand operations, the proper sprinkling of the sand is dependent upon the judgment and diligence of the operative, and this sprinkling being sometimes carelessly omitted with resulting loss and damage.

The present invention provides an automatic mechanism adapted to travel along with the brick unit being formed and the successive layers of which are to be sanded, until the unit is completed, and having a self acting means to thereafter return the sanding device to initial position ready to travel along with and sand another unit of bricks. In the embodiment shown, the sand carrier and distributer is arranged to move along with a slowly moving hacking conveyer and to pay out the sand as the sand distributer moves back and forth transversely of the line of movement of the hacking conveyer, to sprinkle a layer of sand over each layer as deposited in forming the unit. This application of the invention to a movable hacking conveyer is to be understood as merely illustrative, as the device can be likewise used in connection with drier cars movable along a track, and while the showing in the present case contemplates the delivery of the bricks to the movable conveyer by a hacking conveyer system in successive layers, it is to be understood as not limited thereto, since the layers of brick may be supplied to the movable conveyer portion associated with the present invention, in any desired manner.

The invention will be more fully understood from the following detailed description in connection with the accompanying drawings, and will thereafter be pointed out in the appended claims.

Figure 2:
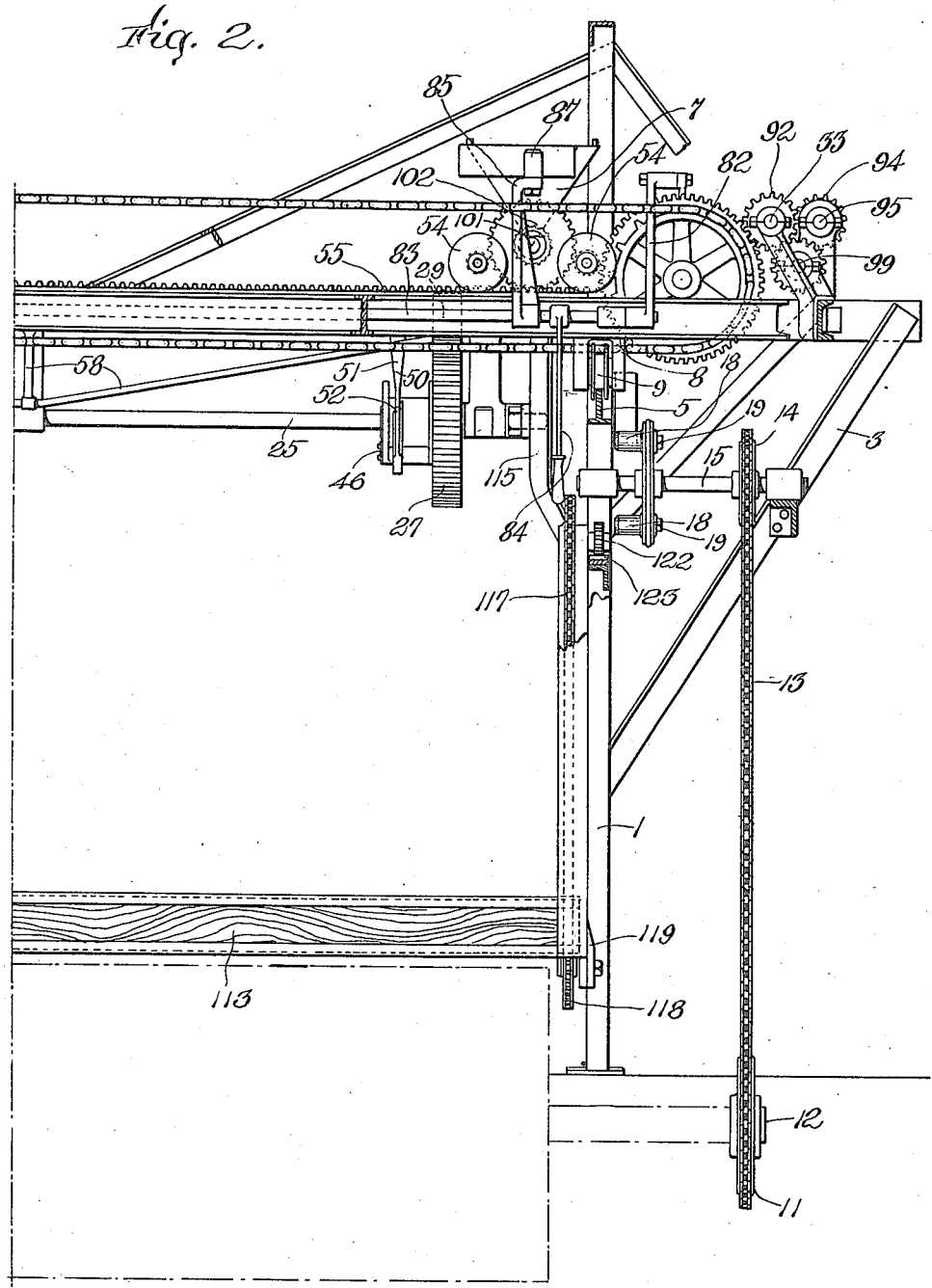
Figure 3:
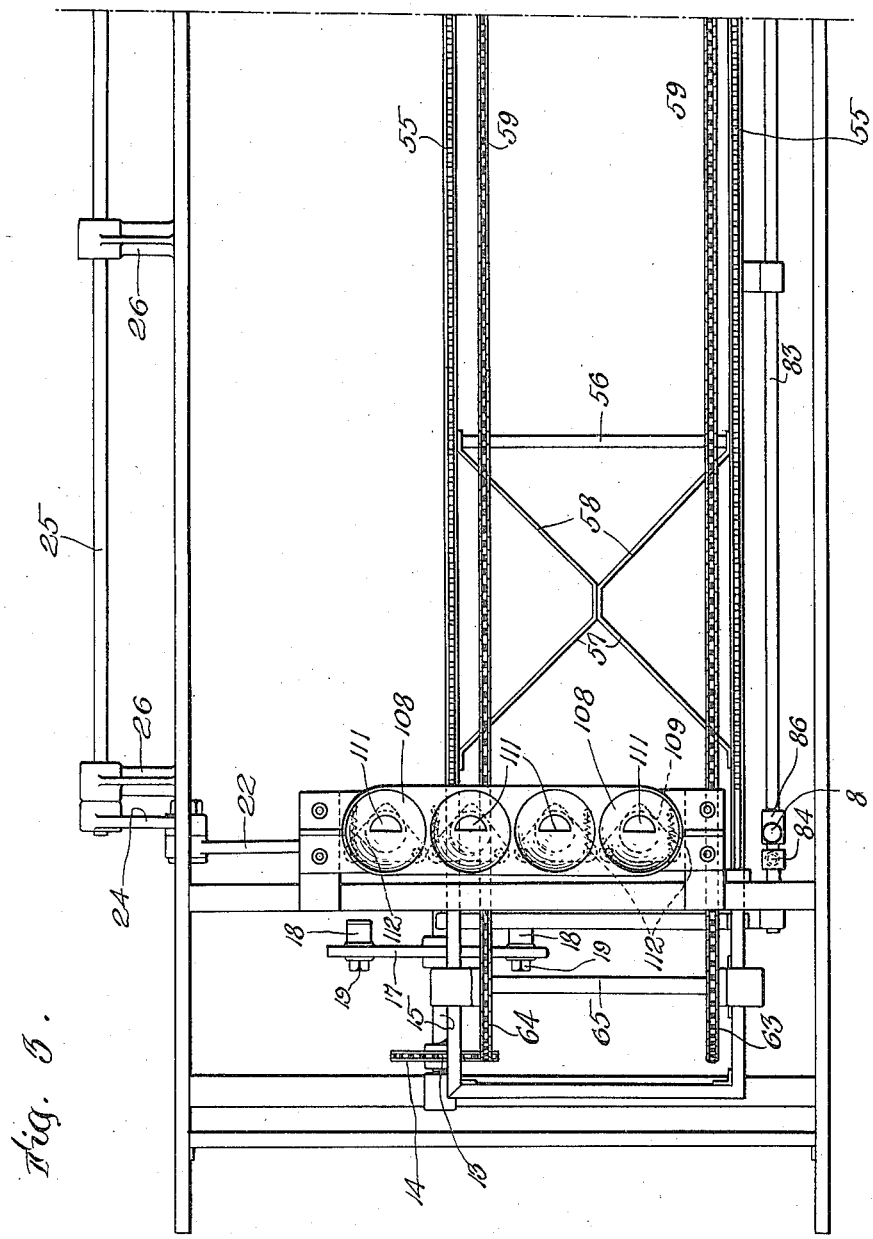
Figure 4:
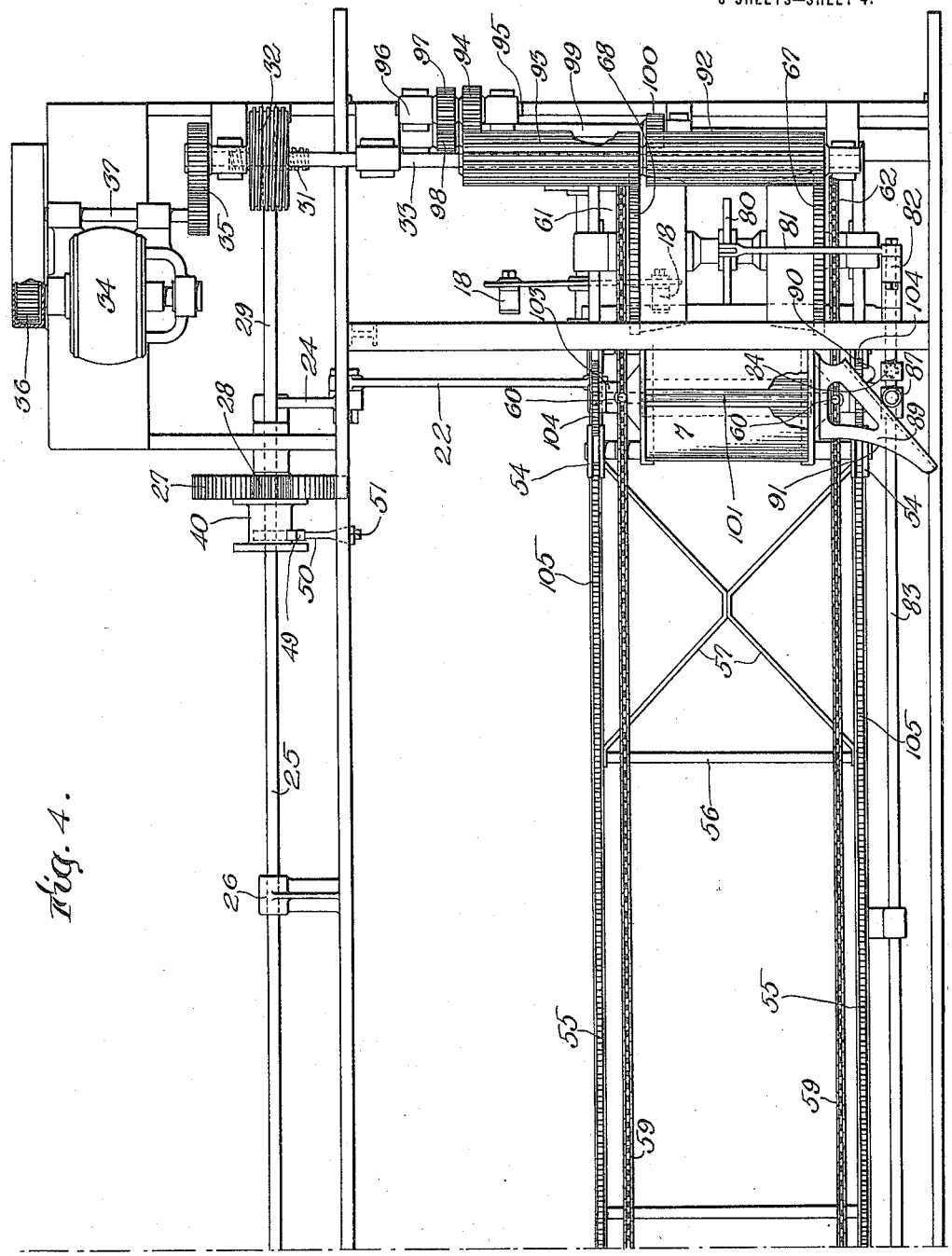
Figure 5:
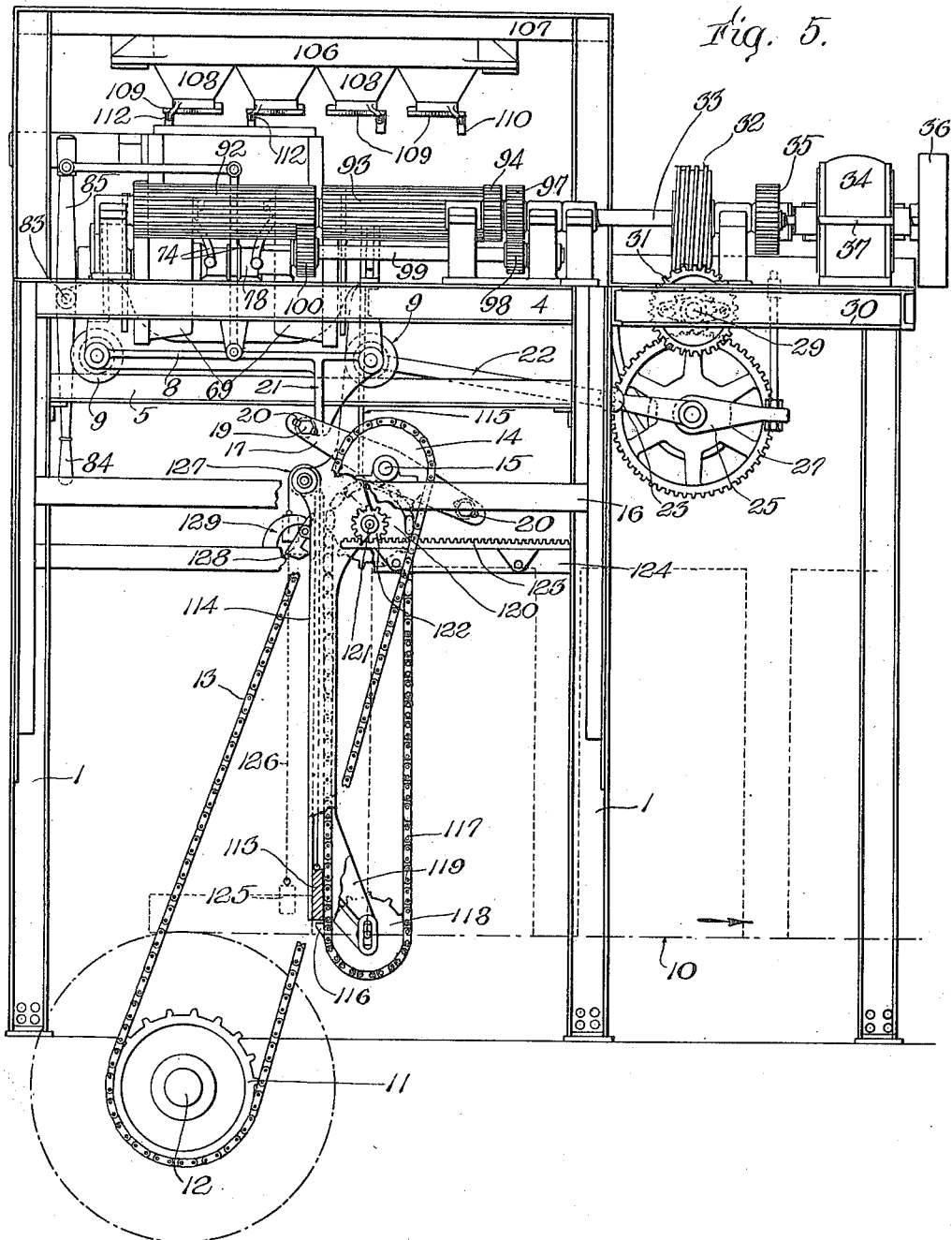
Figure 7:
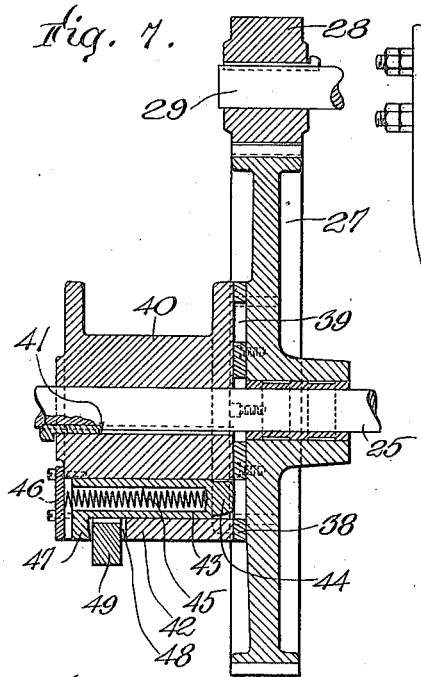
Figure 6:
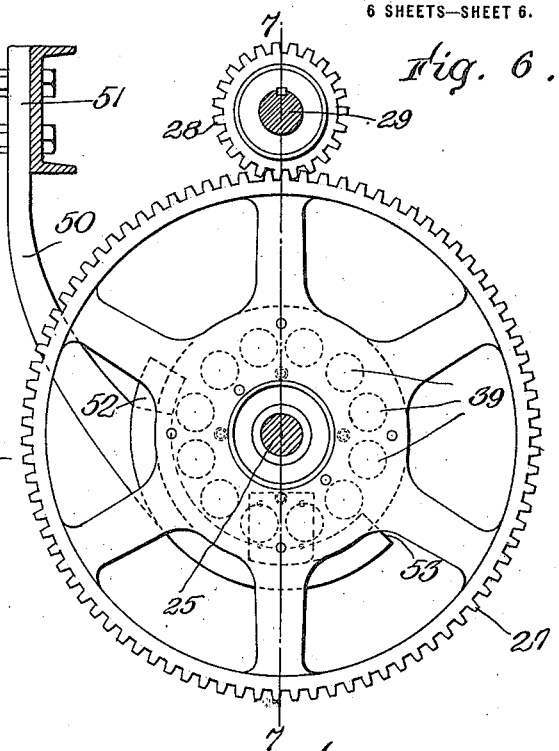
Figure 8:
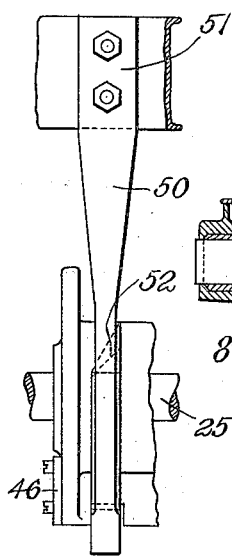
Figures 9, 10:
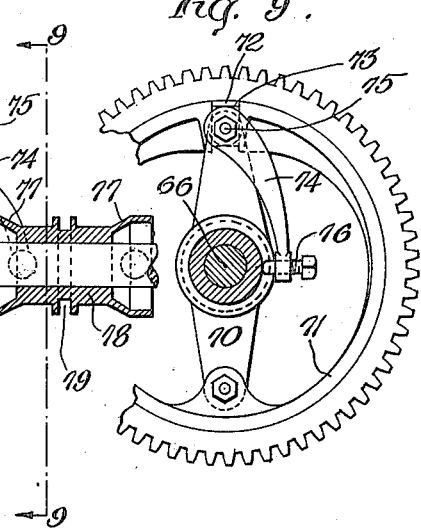

Referring to the drawings: Figures 1 and 2 are complemental views, together constituting a side elevation of the sanding mechanism extending transversely of the movable conveyer. Figs. 3 and 4 are complemental views constituting together a plan of the apparatus. Fig. 5 is an end view from the right of Figs. 2 and 4. Fig. 6 is a detail elevation of an intermittent driving connection for returning the sander carriage, the shafting and a support being shown in section. Fig. 7 is a sectional view on line 7—7 of Fig. 6. Fig. 8 is a fragmentary elevation of a drive-controlling arm and coöperating parts as seen looking from the left in Fig. 6. Fig. 9 is a broken away elevation of the clutch drive connection for the sand holder taken in section on line 9—9 of Fig. 10. Fig. 10 is a central longitudinal section through the parts shown in Fig. 9.

The apparatus is mounted on a framework formed preferably of structural steel with uprights 1 at either side of the movable conveyer supporting at a suitable elevation thereabove a horizontal frame 2 riveted or otherwise fastened thereto, this frame being braced and rendered rigid by suitable braces 3 and struts 4. The frame 2 thus extends across the movable conveyer and at an elevation thereabove sufficient for clearance of the completed brick unit deposited on the movable conveyer. Its width or extent along the line of movement of the movable conveyer is sufficient to enable the sand distributer and its carriage to move along with the movable conveyer on a track composed of bars 5, 6 extending between the uprights 1 on either side, while the layers to form a brick unit are being successively deposited on the slowly moving conveyer, the sanding machine being arranged at the receiving end of this conveyer as set forth in Fig. 5. The sand distributer hopper 7 is mounted on a carriage 8 having flanged rollers 9 at either end, engaging the rails 5, 6. This carriage is caused to move along with the movable conveyer shown diagrammatically at 10, which is arranged to move in the direction indicated by the arrow in Fig. 5. To effect this result, the carriage 8 is preferably operated in this direction by a connection from the movable conveyer 10 consisting of sprocket wheels 11 fixed at either end of the shaft 12 rigid with a supporting drum of said movable conveyer, said movable conveyer driving by means of sprocket chains 13 sprocket wheels 14 on shafts 15 journaled in bars 16. Each shaft 15 at either end has fixed thereon oppositely extending arms 17 having rollers 18 adjustably fixed thereto by bolts 19 engaging in lengthwise extending slots 20 formed in the ends of said arms. The rollers 18 extend into the path of the vertical bracket faces 21 depending from the carriage 8 at either end thereof. The sprocket wheels 11, 14 and the arms 17 are so proportioned that the rollers 18 engaging the vertical faces 21 will move the carriage 8 along over the movable conveyer 10 at substantially the same rate that said conveyer is traveling. The engagement of rollers 18 with vertical faces 21 takes place when the carriage 8 is at the left hand limit of its movement as seen in Fig. 5, and the carriage is moved by said rollers until it reaches the right hand limit of its movement, i. e., while a unit is being built up to completion on the slow moving conveyer 10, when the rollers 18 pass off the ends of the faces 21 in their continuing movement. The carriage 8 has pivotally connected thereto links 22 which are pivoted at 23 to crank arms 24 fixed to a shaft 25, extending the length of the frame and journaled in suitable bearings 26 on the fixed frame. The crank arms are so proportioned that the movement of the carriage 8 from its left to its right extreme positions will move the crank arms through substantially one half a revolution, i. e., from the position shown in Fig. 5 to the opposite side of shaft 25. The shaft 25 has loosely mounted thereon near its end adjacent the driving mechanism, a gear wheel 27 constantly driven by a pinion 28 fixed on shaft 29. The shaft 29 is suitably journaled in a lateral horizontal extension 30 of the framework and has fixed thereon a worm wheel 31 for engagement by a worm 32 on a shaft 33 also suitably journaled in the framework extension 30 and driven from a motor 34 likewise mounted on this extension through reducing back gearing 35, 36 and countershaft 37 connecting the same. The gear 27 thus continuously driven has fixed thereon at one side a circular plate 38 mounted concentric with the gear and provided with a series of apertures 39 formed in a circle about the axis, i. e., about shaft 25. Fixed on shaft 25 close to the plate 38 is a spool 40, this spool being made rigid with the shaft 25 by a key and slot fastening 41, or other equivalent connection. The spool 40 has an enlargement 42 at one side thereof, which is provided with a guiding aperture extending lengthwise of the spool for a locking pin 43. This pin has its front end 44 adapted to engage into one of the holes 39 in plate 38 and the pin is normally urged forward for such engagement by a spring 45 seated in a central aperture bored out therefor in the pin. This spring and pin 43 are held in proper position in the spool and against displacement by a plate 46 suitably fastened to the end of the spool over the pin. The pin 43 has a limited range of movement lengthwise of the spool sufficient to enable its forward end 44 to be withdrawn from driving engagement with an aperture 39, and to effect such withdrawal, a lateral projection 47 on the pin extends into a transverse recess 48 in the enlarged portion of the spool opening into the pin guiding hole thereof, and this lateral projection is engaged by a nearly semicircular plate 49 rigidly mounted on an arm 50 immovably fixed to the framework of the machine at 51. This plate is curved so as to extend into engagement with the lateral projection 47 throughout its length and its forward end 52 is beveled so as to effect the withdrawal of the pin as the pin comes in engagement therewith in the turning of the spool.

It may now be understood that as the platform conveyer 10 moves the carriage along with it, as described, until a roller 18 passes off the vertical face 21, the shaft 25 is turned from the position shown in Fig. 5 through half a revolution, turning with it the spool 40 until the lateral projection 47 on pin 43 passes off the rear end 53 of the plate 49, the plate 49 being so disposed that the lateral projection 47 is disengaged therefrom just as the movement of the carriage under the influence of roller 18 from the platform conveyer is completed, i. e., just as the backing of a unit on the conveyer is completed. The end 44 of the pin 43 being now projected into one of the apertures 39 by the spring 45, the constantly driven gear 27 is locked to shaft 25 and thus transmits impulse from the motor 34 to return the carriage 8 to its initial position, whereupon the forward inclined end 52 in plate 49 comes into engagement with the lateral projection 47 and moves the pin 43 outward so that it is again disconnected from the driving gear 27 and it is held thus disengaged by said plate until the carriage 8 is again moved forward by the platform conveyer as described, for sanding the layers of the next unit. The sand distributer 7 may be arranged to sprinkle the necessary veil of sand evenly over the brick layer in a variety of ways, but in the preferred embodiment shown the distributer is in the form of a relatively compact hopper which is arranged to move back and forth across the platform conveyer distributing a continuous veil of sand as it moves, and receiving at each reciprocation a supply of sand from a stationary reservoir at one end of the frame. The distributing hopper 7 is for this purpose provided with flanged supporting rollers 54 engaged with top rails 55 of carriage 8 which constitute a track therefor. These rails 55 and the carriage 8 are suitably braced transversely by struts and braces 56, 57, and may be held rigid vertically and against sagging by suitable truss work 58. The hopper 7 is moved over the track 55 by sprocket chains 59 at either side of the carriage suitably fixed to the ends of the hopper as shown at 60. These chains engage over driving sprocket wheels 61, 62 at one side of the carriage and over idler sprocket wheels 63, 64 mounted on the shaft 65 at the other side of the carriage. The driving sprockets 61, 62 are fixed to a shaft 66 suitably journaled in the carriage 8 and are adapted to be driven in either direction from oppositely driven gears 67, 68 loosely mounted on the shaft 66 and adapted to be clutched thereto one at a time. To effect this the gears 67, 68 carry friction sleeves 69 extending laterally therefrom and toward each other. Within each of these sleeves arms 70 fixed to the shaft 66 extend out to near the sleeve at either side of the shaft, these arms carrying a clutch ring 71 split at 72 and adapted to be expanded to grip the interior of either sleeve 69, it being understood that one of these clutch rings is arranged for coöperation with each of the sleeves 69 on gears 67, 68. The split rings 71 are expanded into gripping engagement with the sleeve 69 by expanding blocks 73 rigid with lever arms 74 pivoted at 75 to arms 70. Lever arms 74 are provided with adjustable pins 76 at their free ends adapted to be engaged by cone formations 77 at the ends of a spool 78 slidable on shaft 66. This spool has a central annular groove 79 engaged by a shipper 80, having a link connection 81 to a lever arm 82 on an oscillatory shipper shaft 83 suitably journaled in the carriage 8. This shipper shaft is operable manually by a hand lever 84 at the front of the machine, and also automatically from the hopper movement by arms 85, 86 fixed to the shaft 83 and upstanding therefrom with the rollers 87, 88 at the end thereof in the path of a plate 89 extending from the end of the hopper 7, having an oblique cam formation 90 on one side to engage and operate the roller 87 on the upstanding arm 85 at one end, and another oblique cam face 91 to engage and operate the arm 86 at the other end. To effect the drive of gears 67, 68 in opposite directions and throughout their movement with the carriage 8 along with the platform conveyer, they are engaged with long pinions 92, 93 respectively, the pinion 93 being fixed on the shaft 33 and of a length so as to remain in engagement with the gear 68 throughout the movement of the carriage 8. The pinion 92 is loosely mounted on the outer end of shaft 33, which is for this purpose extended across the framework, and driven from pinion 93, by means of a gear 94 this gear being fixed to a stub shaft 95 suitably journaled in bearings 96 and having also fixed thereon a gear 97 meshing with a gear 98 on a countershaft 99 which has fixed at its other end a gear 100, meshing into pinion 92.

It may now be understood that as a layer of brick is deposited on the platform conveyer 10, the handle 84 may be swung to throw the clutch shipping spool 78 in a direction to impart driving impulse to the sprocket chains 59, and cause the hopper 7 to move across the platform conveyer and distribute the sand, in an even layer over the top of the layer of bricks. As the hopper arrives over the side of the conveyer, the cam face 91 engages the roller 88 at the end of the arm 86, shifting the same to throw the clutch spool 78 to neutral position, disconnecting the drive. As soon as another layer of bricks is deposited on the platform conveyer in the building up of the unit, the operative moves the handle 84 to engage the opposite driving gear, causing the hopper to be returned across the platform conveyer to its initial position, sprinkling a layer of sand over this layer of bricks, when the outer cam face 90 engages roller 87 and again shifts the clutch connection to inoperative position. This operation is continued as the successive layers are deposited in hacked relation to complete the unit being formed; it being understood that during this transverse movement of the hopper 7 across the platform conveyer, it and its carriage 8 are being moved along with the conveyer by the mechanism described.

Any suitable means may be provided for causing the sand to be evenly and regularly delivered by the hopper 7 over the whole extent of the brick layer. The means shown to effect this result consists in a provision of a fluted roller 101 journaled in the lower part of the hopper to extend over and control the outlet slot extending across the "V" shaped bottom 102 of the hopper. This roller is mounted on a shaft 103 having fixed to its ends gears 104 meshing into racks 105 formed on the tops of the rails 55. Thus as the hopper 7 travels along, the fluted roller 101 will be rotated to feed the sand out evenly and regularly, producing a continuous veil or film, as desired. The hopper 7 is automatically filled with sand at each reciprocation from a reservoir supply thereof shown at 106 fixed on an upstanding support 107 at an end of the machine. This reservoir has a series of depending spouts 108 controlled by pivoted slide valves 109, having depending fingers 110 engageable by the hopper as it reaches the limit of its movement to swing said valves to open the semicircular openings 111 in the bottom of the spouts 108. As the hopper moves from beneath these spouts the valves 109 are closed by springs 112.

In connection with the depositing in hacked relation and sanding of the successive layers on the platform conveyer as the unit is being built up, it is necessary to aline the sides of the units and space these apart so that when the mechanical setter lifts the unit, the ends of the brick will not come in contact with the unit next to it so as to mar the ends of the brick, and to this end a guide or backing board 113 is provided. This board extends the width of the platform conveyer and its ends are guided to slide in vertical guides 114 fixed to hangers 115 depending from the carriage 8, so as to partake of the forward movement of said carriage with the platform conveyer and also of its automatic return by the motor drive. This backing board is gradually raised with the building up of the unit so as to be opposite each successive layer as it is deposited while moving along with the platform conveyer 10 and to this end it is engaged by projections 116 on sprocket chains 117 engaged over sprocket wheels 118 carried by brackets 119 at the lower end of guides 114. The upper reaches of the chains 117 pass around sprocket wheels 120 fixed on shafts 121 suitably mounted in the hangers 115 depending from carriage 8. These shafts also have fixed thereto pinions 122, meshing with racks 123 rigid with the framework, being fixed to cross bars 124 thereof. The backing board 113 may be partly counterbalanced by weights 125 at either end fixed to cords 126 and passing over pulleys 127 journaled in the hangers 115. Thus as the carriage 8 moves forward along with the platform conveyer, the pinions 122 carried thereby, meshing with the fixed racks 123, will operate the sprocket chains 117, causing the projection 116 thereon to gradually lift the backing board 113 as the unit grows, until its bottom is engaged by pivoted catches 128 carried by hangers 115. As this occurs, the carriage is at the forward limit of its movement and as it is returned by the motor, the backing board is held elevated so as to pass over the top of the brick unit, by the catches 128 at either end, until the carriage reaches the limit of its backward movement, when the catches 128 are tripped by stops 129, permitting the backing board to again descend into position adjacent the platform, as shown in Fig. 5, so as to be in position to aline the first layer of the next unit.

The present machine is especially adapted for use as a part of a system for handling bricks from the molding machine to the kiln mechanically, and wholly dispensing with the multiple hand operations and manual handling of the bricks heretofore usual. In operation as a part of this system the bricks are delivered in successive layers in hacked relation on the platform conveyer 10, by a carrier adapted to deposit the successive layers on top of one another on the conveyer 10, to build up hacked units thereon, and as this building up of the units progresses, the backing or guide board 113 keeps the edge of the unit even and spaced away from the adjacent unit, so as to make an intervening gap and enable the proper operation of the mechanical setter which is to lift each unit of brick *en masse*. The movement of the distributing hopper across the conveyer platform is under the control of the operative by means of the handle 84 as described, so that, as each layer is hacked on to the platform, by a single movement of this lever the hopper is caused to traverse the conveyer and distribute the layer of sand over the top of the bricks. The forward movement of the carriage 8 with the sand distributer along with the platform 10 and its return to initial position over the receiving portion of the conveyer where a new unit is to be started are entirely automatic, being controlled by the plate 49 and coöperating parts, as described, so that the drive from the motor 34 for returning the carriage is thrown in and out at the proper times. The particular form and arrangement of the driving mechanism from the motor 34 is merely illustrative, but such a separate motor drive is preferable, since a belt driving connection from overhead would interfere with the operation of the mechanical setter which is preferably employed in connection with the apparatus.

It is to be understood that while a platform conveyer 10 has been referred to for illustrative purposes in the foregoing description, this in the form shown is not an essential of the invention in its broader aspects, but the sanding mechanism as described, with little or no modification is adapted to coöperate with drier cars or other receivers for the layers of bricks as they are successively deposited to form the units. Further, that while in the embodiment shown, the hopper has its starting movement controlled by hand and automatically stopped at its completion, this likewise is merely illustrative and either the starting or the stopping mechanism, or both, can be controlled automatically or by hand, as found most convenient.

Many other variations in detail can be made without departing from the spirit of the invention, and I therefore do not desire to be limited in the above or any other particular, except as set forth in the appended claims.

Having described my invention, what I claim as new and desire to secure by Letters Patent, is:

1. An apparatus of the kind described, comprising a traveling platform adapted to receive layers of brick to be formed into a stack, and traveling sanding means having connections causing it to be moved automatically a limited distance with said platform for distributing a covering of sand over the successive layers and then returned to initial position, said sanding means having other connections giving it a separate movement and operation to spread the sand over all parts of the layers.

2. An apparatus of the kind described, comprising a movable platform for receiving layers of bricks to form a stacked unit, a sand distributer, means for causing said distributer to travel along a limited distance with said platform in time therewith, and means for moving said distributer transversely of the direction of platform movement to distribute a covering of sand over all parts of each layer of bricks.

3. An apparatus of the kind described, comprising a movable platform for receiving layers of bricks, a sand distributer mounted thereover for movement along therewith, connections including a part depending from said distributer, and a rotary member connected to be operated with said platform for moving said distributer a limited distance with said platform and being then disengageable, a separate driving mechanism, a normally disengaged clutch connection from said driving mechanism to said distributer, and means for engaging said clutch connection at the termination of said movement of said distributer to return the same to initial position, said connection being then automatically disengaged.

4. An apparatus of the kind described, comprising a movable platform, a sand distributer mounted thereover and having temporary connections to be moved a limited distance therewith, a separate driving mechanism carrying a clutch member, a coöperative clutch member connected with said distributer and held normally disengaged, and means for connecting said clutch members at the end of the distributer movement to return the distributer to initial position.

5. An apparatus of the kind described, comprising a traveling receiver for a stacked pile of bricks, a sand distributer mounted for movement above the top of a stack of bricks on said receiver in the direction of receiver movement, said distributer having temporary connections to be moved a limited distance by said receiver and along therewith, separate driving mechanism carrying a clutch member, a coöperative clutch member connected with said distributer, and means for holding said clutch members normally disengaged, said parts being formed and arranged for a temporary engagement of said clutch members at the termination of said movement of said distributer for an automatic return of the distributer to initial position.

6. An apparatus of the kind described, comprising a traveling platform for receiving built-up layers of bricks to form a stack, a sand distributer mounted thereover above the top of a stack on said platform, for movement along therewith and also cross-wise thereof, said distributer having temporary self-engaging connections to be automatically moved a limited distance with said platform, means for moving said distributer cross-wise of said platform to distribute a covering of sand over the bricks thereon, and means operated by the movement of the distributer for positively delivering the sand therefrom evenly over the different parts of the brick layer.

7. An apparatus of the kind described, comprising a traveling platform for receiving layers of bricks to form a brick stack and for advancing said stack, a sand distributer mounted thereover for movement in the direction of platform movement, means connected for operation in time with the platform engageable with said distributer to move it a limited distance along therewith, and being then self-releasing, and a separate driving mechanism for moving the sand distributer having a clutch connection thereto formed to be held automatically disconnected during the movement of the distributer along with the platform and arranged to then become self-connecting to return the platform to initial position.

In testimony whereof, I have signed my name to this specification, in the presence of two subscribing witnesses.

RAYMOND C. PENFIELD.

Witnesses:
F. H. SNEART,
C. P. MERTENS.